US011223290B2

(12) United States Patent
Yamada (10) Patent No.: US 11,223,290 B2
(45) Date of Patent: Jan. 11, 2022

(54) POWER CONVERSION DEVICE, CONTROL METHOD, AND COMPUTER-READABLE MEDIUM

(71) Applicant: FUJI ELECTRIC CO., LTD., Kanagawa (JP)

(72) Inventor: Ryuji Yamada, Hachioji (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 0 days.

(21) Appl. No.: 17/079,550

(22) Filed: Oct. 26, 2020

(65) Prior Publication Data

US 2021/0159804 A1 May 27, 2021

(30) Foreign Application Priority Data

Nov. 21, 2019 (JP) .............................. JP2019-210557

(51) Int. Cl.
*H02M 3/335* (2006.01)
*H02M 1/38* (2007.01)
*H02M 1/00* (2006.01)

(52) U.S. Cl.
CPC ......... *H02M 3/33584* (2013.01); *H02M 1/38* (2013.01); *H02M 3/33553* (2013.01); *H02M 3/33573* (2021.05); *H02M 1/0003* (2021.05)

(58) Field of Classification Search
CPC ............... H02M 3/33584; H02M 1/38; H02M 3/33573; H02M 3/33553; H02M 1/0003
See application file for complete search history.

(56) References Cited

U.S. PATENT DOCUMENTS

| 3,646,452 A | * | 2/1972 | Horowitz | ................ H04L 7/033 327/159 |
| 9,013,137 B2 | * | 4/2015 | Aoki | ....................... H02P 21/26 318/810 |

(Continued)

FOREIGN PATENT DOCUMENTS

| JP | H05336670 A | 12/1993 |
| JP | 2004224267 A | 8/2004 |

(Continued)

OTHER PUBLICATIONS

Office Action issued for counterpart Japanese Application No. 2019-210557, issued by the Japanese Patent Office dated Apr. 7, 2020 (drafted on Apr. 2, 2020).

*Primary Examiner* — Yusef A Ahmed (57) ABSTRACT

A power conversion device includes a transformer, and a first bridge circuit connected to a primary-side of the transformer and capable of switching a polarity of a connection between a pair of DC bus bars on the primary-side and the transformer. A second bridge circuit is connected to a secondary-side of the transformer and capable of switching a polarity of a connection between a pair of DC bus bars on the secondary-side and the transformer. A control device is provided which is capable of performing control of switching the first bridge circuit and the second bridge circuit with a phase difference. The control device has a frequency adjustment unit for adjusting a frequency of switching of the first bridge circuit and the second bridge circuit, according to an output from the first bridge circuit or the second bridge circuit and a target value.

9 Claims, 7 Drawing Sheets

(56) References Cited

U.S. PATENT DOCUMENTS

| | | | | |
|---|---|---|---|---|
| 9,570,991 | B2* | 2/2017 | Akutagawa | H02M 3/33584 |
| 10,658,936 | B2* | 5/2020 | Sun | H02M 3/04 |
| 10,749,441 | B1* | 8/2020 | Singh | H02M 3/33584 |
| 10,804,808 | B1* | 10/2020 | Fu | H02M 3/33584 |
| 2014/0028092 | A1* | 1/2014 | Takeshima | H02M 3/33507 307/10.1 |
| 2014/0347891 | A1* | 11/2014 | Muto | H02M 3/33584 363/17 |
| 2015/0015181 | A1* | 1/2015 | Kondo | H02M 3/33584 320/103 |
| 2015/0229217 | A1* | 8/2015 | Hirano | H02M 1/32 363/17 |
| 2015/0244279 | A1* | 8/2015 | Takagi | H02M 3/33561 363/17 |
| 2015/0295504 | A1* | 10/2015 | Tanahashi | H02M 3/33584 307/24 |
| 2015/0333634 | A1* | 11/2015 | Yoshida | H02M 3/33576 363/21.03 |
| 2016/0294290 | A1* | 10/2016 | Tamura | H02M 3/33584 |
| 2018/0054136 | A1* | 2/2018 | Jimichi | H02M 1/38 |
| 2019/0173387 | A1* | 6/2019 | Tanaka | H02M 1/08 |
| 2020/0014307 | A1* | 1/2020 | Kidera | H02M 3/3376 |
| 2020/0083719 | A1* | 3/2020 | Suzuki | H02M 7/53871 |
| 2020/0274443 | A1* | 8/2020 | Itogawa | H02M 3/33584 |
| 2020/0287468 | A1* | 9/2020 | Mizutani | H02M 3/33576 |
| 2021/0167689 | A1* | 6/2021 | Nakahara | H02M 3/158 |

FOREIGN PATENT DOCUMENTS

| | | |
|---|---|---|
| JP | 2014230368 A | 12/2014 |
| JP | 2017130997 A | 7/2017 |
| JP | 2019118234 A | 7/2019 |

\* cited by examiner

POWER CONVERSION DEVICE, CONTROL METHOD, AND COMPUTER-READABLE MEDIUM

The contents of the following Japanese patent application is incorporated herein by reference:

NO. 2019-210557 filed in JP on Nov. 21, 2019

BACKGROUND

1. Technical Field

The present invention relates to a power conversion device, a control method, and a computer-readable medium.

2. Related Art

In the related art, as a power conversion device that can supply bidirectionally electric power, a bidirectional DC/DC converter such as a DAB (Dual Active Bridge) converter is used (for example, refer to Patent Document 1). In the bidirectional DC/DC converter, bridge circuits on a primary-side and a secondary-side are connected via a transformer. In the bidirectional DC/DC converter of Patent Document 1, an intermittent operation is performed in a region in which electric power to be transmitted is lower than a threshold value.

PRIOR ART DOCUMENTS

Patent Document

Patent Document 1: Japanese Patent Application Publication No. 2017-130997

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
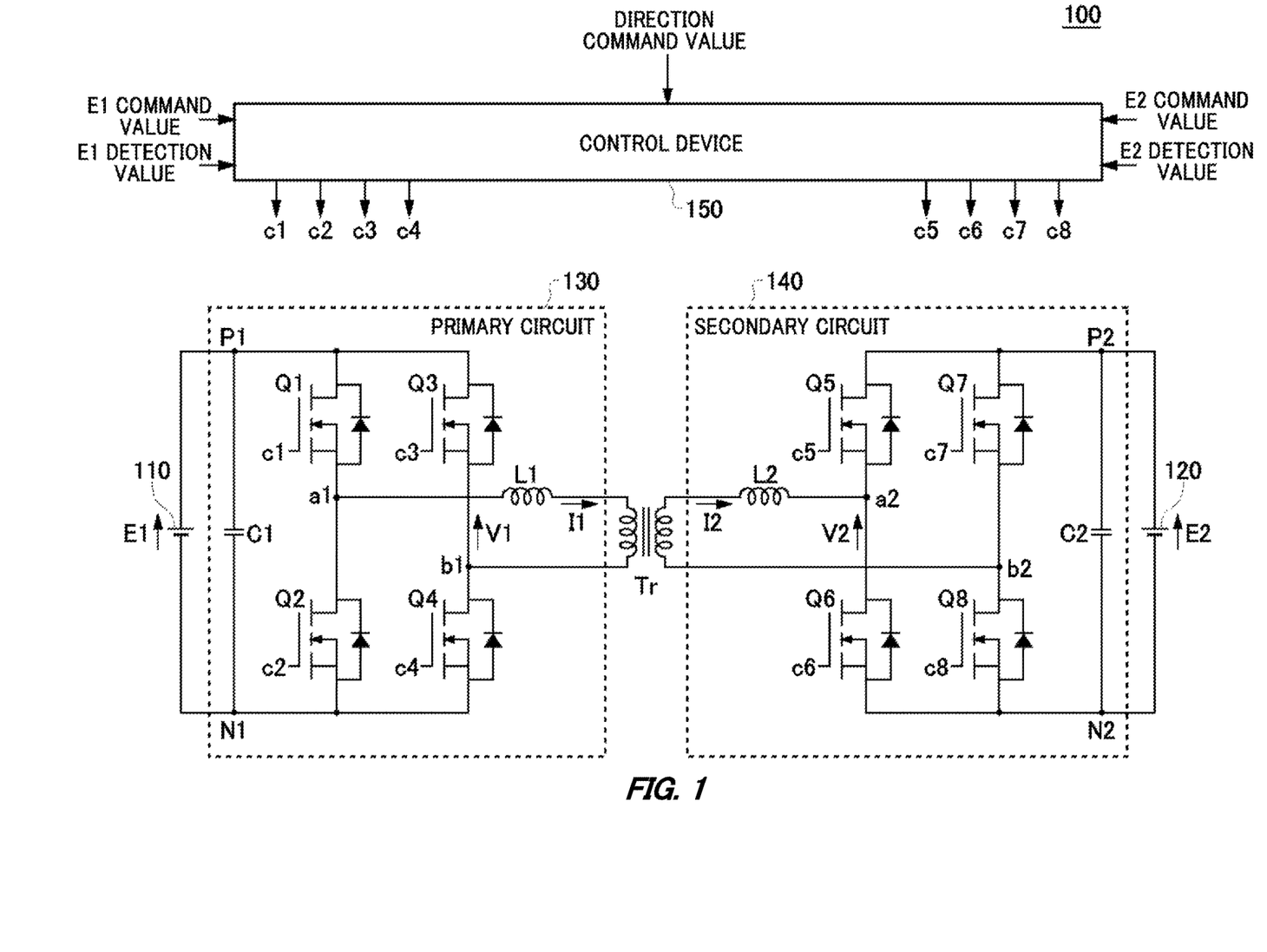
FIG. 1 shows a configuration of a power conversion device 100 in accordance with the present embodiment, together with a primary-side device 110 and a secondary-side device 120.

FIG. 1 shows a configuration of a power conversion device 100 in accordance with the present embodiment, together with a primary-side device 110 and a secondary-side device 120. The power conversion device 100 may be an isolated DC/DC converter, and can bidirectionally supply electric power between the primary-side device 110 connected to a primary-side and the secondary-side device 120 connected to a secondary-side.

The primary-side device 110 and the secondary-side device 120 are devices that are connected to the power conversion device 100. Each of the primary-side device 110 and the secondary-side device 120 may have a function of outputting electric power and a function of receiving electric power. For example, one of the primary-side device 110 and the secondary-side device 120 (for example, the primary-side device 110) may be an electric storage device, and may receive and charge electric power that is transmitted via the power conversion device 100 from the other one of the primary-side device 110 and the secondary-side device 120 (for example, the secondary-side device 120), and may supply the charged electric power to the secondary-side device 120, as necessary. Also, for example, one of the primary-side device 110 and the secondary-side device 120 (for example, the secondary-side device 120) may be a drive device such as a motor, and may be driven using electric power that is supplied from the other one of the primary-side device 110 and the secondary-side device 120 (for example, the primary-side device 110), and during a regenerative operation, may supply electric power that is obtained as a result of the regenerative operation to the primary-side device 110. Also, each of the primary-side device 110 and the secondary-side device 120 may be, for example, a system in which a photovoltaic device and an electric storage device are combined.

The power conversion device 100 includes a transformer Tr, a primary circuit 130, a secondary circuit 140, and a control device 150. The transformer Tr has a primary winding and a secondary winding. A winding ratio of the primary winding and the secondary winding of the transformer Tr may be determined according to a ratio of the rated voltages of the primary-side device 110 and the secondary-side device 120. Herein, for the convenience of descriptions, an example where the winding ratio of the transformer Tr is 1:1 is illustrated.

The primary circuit 130 is connected to a positive-side terminal and a negative-side terminal of the primary-side device 110, and transfers electric power to and from the primary-side device 110. Also, the primary circuit 130 is connected to the primary-side of the transformer Tr, and transfers electric power to and from the primary winding of the transformer Tr.

The primary circuit 130 has a pair of DC bus bars P1 and N1 on the primary-side, and the positive-side terminal of the primary-side device 110 is connected to the positive-side DC bus bar P1 and the negative-side terminal of the primary-side device 110 is connected to the negative-side DC bus bar N1. The primary circuit 130 may be an inverter (for example, a full bridge inverter) capable of switching a polarity of the connection between the pair of DC bus bars on the primary-side and the primary winding of the transformer.

In the present embodiment, the primary circuit 130 is a bridge circuit (referred to as "first bridge circuit"), more specifically, a full bridge circuit. Alternatively, the primary circuit 130 may also be implemented by a half bridge circuit (for example, a neutral point clamp-type three-level inverter) capable of switching the polarity of the connection between the pair of DC bus bars on the primary-side and the primary winding of the transformer.

The primary circuit 130 has a capacitor C1, switching devices Q1 to Q4, and an inductor L1. The capacitor C1 is connected between the pair of DC bus bars P1 and N1 on the primary-side, and smoothens the voltage and current that are transferred between the primary circuit 130 and the primary-side device 110.

The switching devices Q1 to Q4 may each be a MOSFET such as a power MOSFET, an IGBT (isolated gate bipolar transistor), or the like, and have a full bridge configuration. The switching devices Q1 and Q2 are connected in series in corresponding order between main terminals (between a drain and a source in a MOSFET, and between a collector and an emitter in an IGBT) between the pair of DC bus bars P1 and N1, and control terminals c1 and c2 (gates) thereof are connected to the control device 150. The switching devices Q1 and Q2 may include a diode reversely connected between the main terminals. In a case where the switching devices Q1 and Q2 are MOSFETs, the diode may be a parasitic diode.

The switching devices Q3 and Q4 are connected in series in corresponding order between main terminals between the pair of DC bus bars P1 and N1, and the control terminals c3 and c4 thereof are connected to the control device 150. The switching devices Q3 and Q4 may also include a diode reversely connected between the main terminals.

The inductor L1 is connected in series with the primary winding of the transformer Tr between an intermediate point a1 between the switching devices Q1 and Q2 and an intermediate point b1 between the switching devices Q3 and Q4.

By the above configuration, when the switching devices Q1 and Q4 are turned on and the switching devices Q2 and Q3 are turned off, the primary circuit 130 electrically connects the intermediate point a1 to the DC bus bar P1 and electrically connects the intermediate point b1 to the DC bus bar N1, thereby setting a voltage V1 between the intermediate points a1 and b1 to a positive voltage. Also, when the switching devices Q1 and Q4 are turned off and the switching devices Q2 and Q3 are turned on, the primary circuit 130 electrically connects the intermediate point a1 to the DC bus bar N1 and electrically connects the intermediate point b1 to the DC bus bar P1, thereby setting the voltage V1 to a negative voltage. In this way, the primary circuit 130 is capable of switching the polarity of the connection between the pair of DC bus bars on the primary-side and the primary winding of the transformer. Also, when performing a pause period adjustment operation that will be described later, the primary circuit 130 may be capable of switching the polarity of the primary winding of the transformer between three or more levels including positive, negative and zero. In FIG. 1, when the switching devices Q1 and Q3 are turned on and the switching devices Q2 and Q4 are turned off or when the switching devices Q1 and Q3 are turned off and the switching devices Q2 and Q4 are turned on, the primary circuit 130 electrically connects both the intermediate points a1 and b1 to the DC bus bar P1 or the DC bus bar N1, thereby setting the voltage V1 to be substantially zero.

The secondary circuit 140 is connected to a positive-side terminal and a negative-side terminal of the secondary-side device 120, and transfers electric power to and from the secondary-side device 120. Also, the secondary circuit 140 is connected to the secondary-side of the transformer Tr, and transfers electric power to and from the secondary winding of the transformer Tr. Here, the secondary circuit 140 has a configuration that is substantially similar to the primary circuit 130, except that the secondary circuit 140 is connected to the secondary-side of the transformer Tr and the secondary-side device 120 and a withstand voltage and the like may differ from those of the primary circuit 130 according to a voltage transformation ratio of the transformer Tr. For this reason, the descriptions of the secondary circuit 140 are omitted except the differences from the primary circuit 130.

The secondary circuit 140 has a pair of DC bus bars P2 and N2 on a secondary-side. The pair of DC bus bars P2 and N2 corresponds to the pair of DC bus bars P1 and N1 of the primary circuit 130. Also, the secondary circuit 140 has a capacitor C2, switching devices Q5 to Q8, and an inductor L2. The capacitor C2 corresponds to the capacitor C1 of the primary circuit 130, the switching devices Q5 to Q8 correspond to the switching devices Q1 to Q4 of the primary circuit 130, and the inductor L2 corresponds to the inductor L1 of the primary circuit 130.

In the present embodiment, the secondary circuit 140 is a bridge circuit (referred to as "second bridge circuit"), more specifically, a full bridge circuit, similarly to the primary circuit 130. Alternatively, the secondary circuit 140 may also be implemented by a half bridge circuit (for example, a neutral point clamp-type three-level inverter) capable of switching a polarity of the connection between the pair of DC bus bars on the secondary-side and the secondary winding of the transformer. When performing a pause period adjustment operation that will be described later, the secondary circuit 140 may be capable of switching the polarity of the secondary winding of the transformer between three or more levels including positive, negative and zero. The primary circuit 130 and the secondary circuit 140 may also be bridge circuits or multi-level inverters of different types.

The control device 150 is connected to the primary circuit 130 and the secondary circuit 140, and controls the primary circuit 130 and the secondary circuit 140. In the present embodiment, the control device 150 inputs a direction command value, an E1 command value, an E1 detection value, an E2 command value, and an E2 detection value, and outputs a control signal for controlling on and off states of the control terminals c1 to c4 of the switching devices Q1 to Q4 of the primary circuit 130 and a control signal for controlling on and off states of the control terminals c5 to c8 of the switching devices Q5 to Q8 of the secondary circuit 140.

The direction command value is a command value for instructing whether to transmit electric power from the primary-side to the secondary-side or from the secondary-side to the primary-side. The E1 detection value is an example of an index value indicative of a magnitude of an output from the primary circuit 130 to the primary-side device 110 when transmitting electric power from the secondary-side to the primary-side, and is a measured value of a voltage E1 that is supplied to the primary-side device 110, in the present embodiment. The E1 command value is an example of a target value of an output from the primary circuit 130 to the primary-side device 110, and is a value for instructing a target value of the voltage E1 that should be supplied to the primary-side device 110. The E2 detection value and the E2 command value are similar to the E1 detection value and the E1 command value, except that they are an index value and a target value indicative of a magnitude of an output from the secondary circuit 140 to the secondary-side device 120 when transmitting electric power from the primary-side to the secondary-side.

In the present embodiment, the control device 150 inputs a value indicative of a voltage value of an output destination, as the index value and the target value. Alternatively, the control device 150 may input, as the index value and the target value, a value indicative of a current value of an output destination or a value indicative of an electric power value that is supplied to the output destination, and may control the switching devices Q1 to Q8 based on the values.

Figure 2:
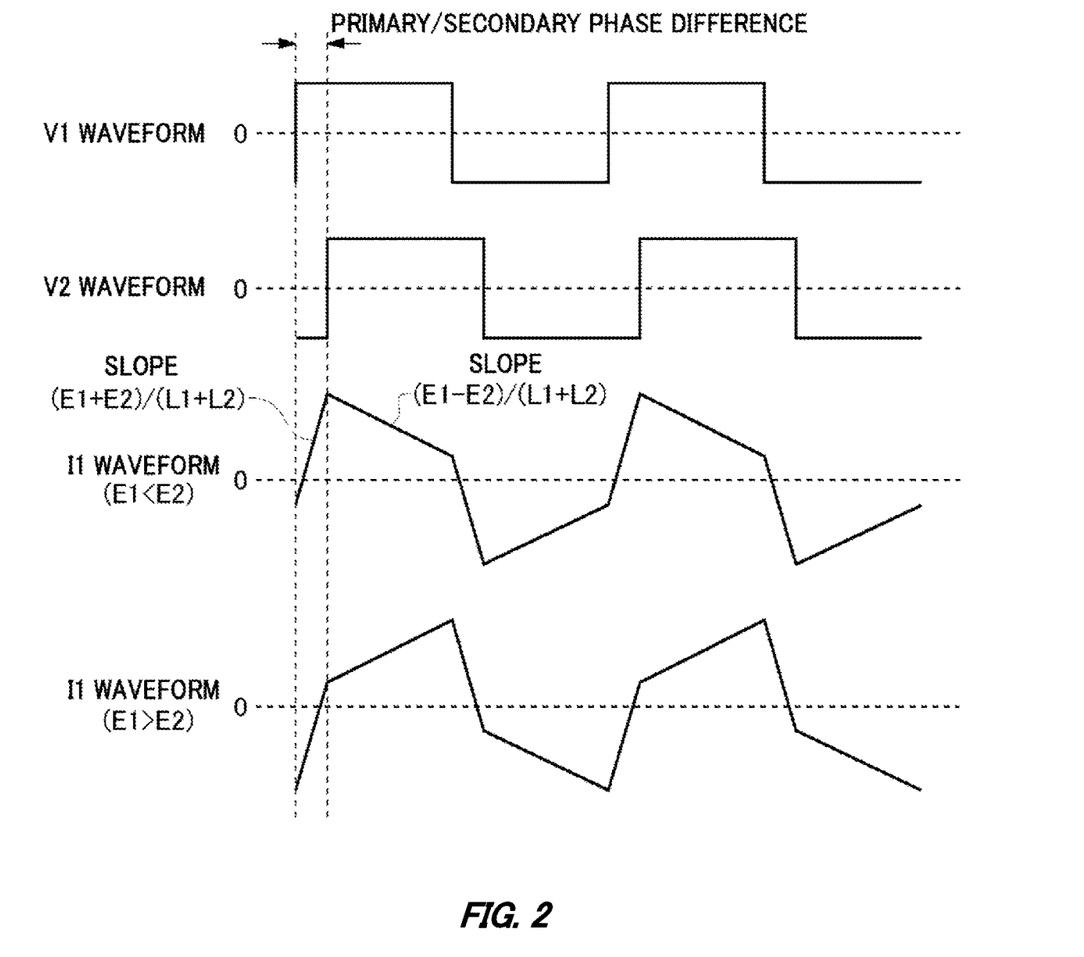
FIG. 2 is an example of an operating waveform of the power conversion device 100 in accordance with the present embodiment.

FIG. 2 is an example of an operating waveform of the power conversion device 100 in accordance with the present embodiment. FIG. 2 shows a waveform of a voltage V1 between the intermediate points a1 and b1 of the primary circuit 130, a waveform of a voltage V2 between the intermediate point a2 and b2 of the secondary circuit 140, a waveform of current I1 flowing through the inductor L1 (a voltage E1<a voltage E2) and a waveform of the current I1 (the voltage E1>the voltage E2), from above. In each waveform, a horizontal axis indicates time.

The control device 150 can perform control of switching the primary circuit 130 and the secondary circuit 140 with a phase difference. Thereby, the power conversion device 100 functions as a DAB converter. FIG. 2 exemplifies a case where electric power is supplied from the primary-side to the secondary-side.

In FIG. 2, the control device 150 causes the voltage V1 to be switched between a positive voltage and a negative voltage at any frequency. The control device 150 can set the voltage V1 to a positive voltage E1 by supplying, to the primary circuit 130, a control signal for turning on the switching devices Q1 and Q3 and turning off the switching devices Q2 and Q4. Also, the control device 150 can set the voltage V1 to a negative voltage −E1 by supplying, to the primary circuit 130, a control signal for turning off the switching devices Q1 and Q3 and turning on the switching devices Q2 and Q4.

Also, the control device 150 causes the polarities of the connection between the intermediate points a2 and b2 connected to both ends of the winding on the secondary-side of the transformer Tr and the positive-side terminal and the negative-side terminal of the secondary-side device 120 to be switched at the same frequency. The control device 150 turns on the switching devices Q6 and Q7 and turns off the switching devices Q5 and Q8, thereby connecting the intermediate point a2 to the negative-side terminal of the secondary-side device 120 and the intermediate point b2 to the positive-side terminal of the secondary-side device 120. In this case, a voltage E2 of the secondary-side device 120 is applied in a reverse direction, so that the voltage V2 becomes a negative voltage −E2. Also, the control device 150 can set the voltage V2 to a positive voltage E2 by turning off the switching devices Q6 and Q7 and turning on the switching devices Q5 and Q8.

The control device 150 causes a phase difference denoted as "primary/secondary phase difference" in FIG. 2 between the switching of the voltage V1 and the switching of the voltage V2. Here, ideally, the transformer Tr causes the current I1 on the primary-side and the current I2 on the secondary-side to flow in a ratio corresponding to a reciprocal of the winding ratio. When the winding ratio is 1:1, the current I1 is ideally the same as the current I2. Therefore, the transformer Tr may be ignored, taking into account the current flowing in the power conversion device 100.

In FIG. 2, when the voltage V1=the voltage E1 and the voltage V2=the voltage −E2, the primary-side device 110 and the secondary-side device 120 are connected in series in a forward direction with respect to the inductors L1 and L2 connected in series, so that a voltage (E1+E2) is applied to an inductance (L1+L2). Thereby, the current I1 (=I2) flowing through the inductors L1 and L2 rises with a slope (E1+E2)/(L1+L2), and the current I1 becomes positive.

Then, when the voltage V1=the voltage E1 and the voltage V2=the voltage E2 after the primary/secondary phase difference, the positive-side terminal of the primary-side device 110 and the positive-side terminal of the secondary-side device 120 are connected via the inductors L1 and L2, so that a voltage (E1−E2) is applied to the inductance (L1+L2). Thereby, the current I1 (=I2) changes with a slope (E1−E2)/(L1+L2).

Here, in a case of the voltage E1<E2, the current I1 decreases. In a case of the voltage E1>E2, the current I1 further increases. In a case of the voltage E1=E2, the current I1 does not change. In an actual circuit, since there is a loss to some extent, the current I1 tends to decrease, as compared to an ideal case.

In the state where the positive-side terminal of the primary-side device 110 and the positive-side terminal of the secondary-side device 120 are connected via the inductors L1 and L2, the positive current I1 (=the current I2) flows, so that the positive current I2 is supplied to the positive-side terminal of the secondary-side device 120 and the secondary-side device 120 can perform charging and the like.

Then, when the voltage V1=the voltage −E1 and the voltage V2=the voltage E2, the primary-side device 110 and the secondary-side device 120 are connected in series in the forward direction with respect to the inductors L1 and L2, in an opposite direction to the case where the voltage V1=the voltage E1 and the voltage V2=the voltage −E2. This is similar to the case where the voltage V1=the voltage E1 and the voltage V2=the voltage −E2, except that the current I1 changes in the opposite direction.

Then, when the voltage V1=the voltage −E1 and the voltage V2=the voltage −E2, the secondary-side device 120 is charged, for example, similar to the case where the voltage V1=the voltage E1 and the voltage V2=the voltage E2.

In the meantime, when supplying electric power from the secondary-side to the primary-side, the control device 150 preferably delays the switching of the voltage V1 with respect to the switching of the voltage V2. In this way, the control of switching the primary circuit 130 and the secondary circuit 140 with the phase difference is performed, so that it is possible to transfer electric power between the primary-side device 110 and the secondary-side device 120. Also, when the winding ratio is not 1:1, the voltage changes according to the winding ratio and the current changes according to a reciprocal of the winding ratio. The others are the same as the above case.

Here, the control device 150 is required to transmit required electric power from the electric power input-side (in this example, the primary-side) to the electric power output-side (in this example, the secondary-side) without excess or deficiency. In particular, in the case of the voltage E1>the voltage E2, even when the voltage V1 and the voltage V2 are positive, the current I1 continues to increase. Therefore, the control device 150 in accordance with the present embodiment has a configuration for adjusting a transmission amount of electric power as described below, so as to prevent excessive electric power from being transmitted to the electric power output-side even in this situation.

Figure 3:
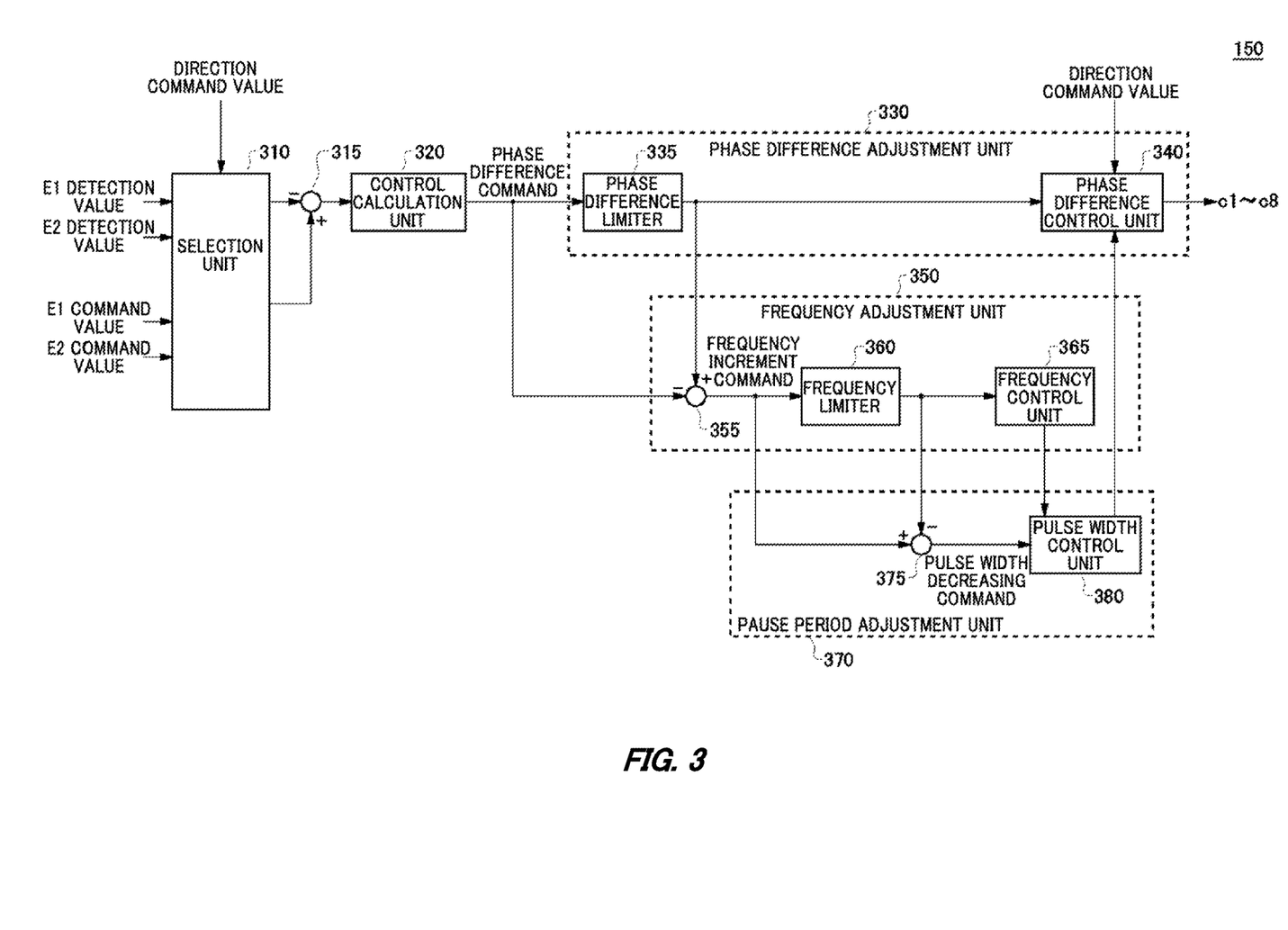
FIG. 3 shows a configuration of a control device 150 in accordance with the present embodiment.

FIG. 3 shows a configuration of the control device 150 in accordance with the present embodiment. The control device 150 can perform a phase difference adjustment operation of adjusting a phase difference of switching of the primary circuit 130 and the secondary circuit 140, a frequency adjustment operation of adjusting a frequency of the switching, and a pause period adjustment operation of adjusting a ratio of a pause period in which transmission of electric power is paused in each switching cycle. Thereby, the control device 150 can control appropriately electric power transmission under diverse conditions such as a relation between the voltage E1 of the primary-side device 110 and the voltage E2 of the secondary-side device 120.

The control device 150 includes a selection unit 310, a subtractor 315, a control calculation unit 320, a phase difference adjustment unit 330, a frequency adjustment unit 350, and a pause period adjustment unit 370. The selection unit 310 selects which of the primary circuit 130 and the secondary circuit 140 is set as an output-side of electric power, in response to an input instruction. The selection unit 310 in accordance with the present embodiment inputs the direction command value, the E1 detection value, the E2 detection value, the E1 command value, and the E2 command value, and selects which of the E1 detection value and the E2 detection value is to be used as a detection value and which of the E1 command value and the E2 command value is to be used as a command value (target value), according to the direction command value. When the direction command value instructs transmission of electric power from the primary-side to the secondary-side, the selection unit 310 selects and outputs the E2 detection value and the E2 command value on the secondary-side that is an output destination. When the direction command value instructs transmission of electric power from the secondary-side to the primary-side electric power, the selection unit 310 selects and outputs the E1 detection value and the E1 command value on the primary-side that is an output destination.

The subtractor 315 calculates a difference between the command value and the detection value selected by the selection unit 310. The subtractor 315 in accordance with the present embodiment calculates a difference by subtracting the detection value from the command value.

The control calculation unit 320 outputs a control value corresponding to a difference between an output (in the present embodiment, the detection value) and a target value (the command value) of the output-side circuit of the primary circuit 130 and the secondary circuit 140. The control value is a value corresponding to an output of the output-side circuit of the primary circuit 130 and the secondary circuit 140, and may also be a value indicative of a magnitude of the output at that timing, for example.

The phase difference adjustment unit 330 adjusts a phase difference of the switching, according to the output and the target value of the output-side circuit of the primary circuit 130 and the secondary circuit 140. The phase difference adjustment unit 330 in accordance with the present embodiment adjusts the phase difference of the switching, according to the control value output by the control calculation unit 320. The phase difference adjustment unit 330 receives the control value output by the control calculation unit 320, as a phase difference command, and adjusts the phase difference of the switching ("primary/secondary phase difference" in FIG. 2) to a phase difference corresponding to the phase difference command. Here, when the phase difference command increases, the phase difference adjustment unit 330 increases an output by increasing a phase delay of the switching of the circuit (the secondary circuit 140, in FIG. 2) on the electric power output-side with respect to the switching of the circuit (the primary circuit 130, in FIG. 2) on the electric power input-side to increase the currents I1 and I2. When the phase difference command decreases, the phase difference adjustment unit 330 decreases an output by decreasing the phase delay to decrease the currents I1 and I2.

The phase difference adjustment unit 330 includes a phase difference limiter 335, and a phase difference control unit 340. The phase difference limiter 335 limits the phase difference command so that the phase difference of the switching does not become smaller than a lower limit phase difference. For example, when a phase difference command instructing to reduce the phase difference below the lower limit phase difference is received, the phase difference limiter 335 limits the phase difference command to the lower limit value so as to prevent the phase difference from being smaller. For example, the lower limit phase difference may be 0. In this case, the phase difference limiter 335 may not set the phase difference of the switching of the circuit on the electric power output-side with respect to the switching of the circuit on the electric power input-side to a minus value. Alternatively, the lower limit phase difference may also be a positive or negative value.

The phase difference control unit 340 receives the limited phase difference command from the phase difference limiter 335, and controls the phase difference between the primary circuit 130 and the secondary circuit 140, according to the phase difference command. The phase difference control unit 340 may set the phase difference between the primary circuit 130 and the secondary circuit 140 to a phase difference designated by the phase difference command. Alternatively, the phase difference control unit 340 may change gradually the phase difference between the primary circuit 130 and the secondary circuit 140 so as to approximate to the phase difference designated by the phase difference command so that the phase difference does not change sharply.

The phase difference control unit 340 inputs a switching waveform (V1 waveform, in the example of FIG. 2) for the input-side circuit of the primary circuit 130 and the secondary circuit 140 from the pause period adjustment unit 370, and delays the switching waveform by a delay amount corresponding to the set phase difference, thereby generating a switching waveform for the output-side circuit. The phase difference control unit 340 outputs a switching waveform for an input-side and a switching waveform for an output-side to the input-side circuit and the output-side circuit of the primary circuit 130 and the secondary circuit 140, according to the direction command value.

The frequency adjustment unit 350 adjusts the switching frequency of the primary circuit 130 and the secondary circuit 140, according to the output from the primary circuit 130 or the secondary circuit 140 and the target value. Here, the frequency adjustment unit 350 adjusts the switching frequency, according to the output from the output-side circuit of the primary circuit 130 and the secondary circuit 140 and the target value. In the present embodiment, the frequency adjustment unit 350 changes the frequency of the switching, on condition that the phase difference of the switching is adjusted to the lower limit phase difference by the phase difference adjustment unit 330.

The frequency adjustment unit 350 includes a subtractor 355, a frequency limiter 360, and a frequency control unit 365. The subtractor 355 outputs a frequency increment command corresponding to a difference between the limited phase difference command output by the phase difference limiter 335 and the phase difference command output by the control calculation unit 320. Thereby, the subtractor 355 outputs a value obtained by subtracting an adjustment amount by the phase difference adjustment unit 330 from a control value output by the control calculation unit 320, and the frequency adjustment unit 350 can adjust the frequency of the switching according to the value. In the present embodiment, the subtractor 355 subtracts the phase difference command output by the control calculation unit 320 from the limited phase difference command output by the phase difference limiter 335, thereby outputting, as the frequency increment command, an inverted value (a minus value) of the command value excluding the adjustment amount by the phase difference adjustment unit 330. When the phase difference of the switching is the lower limit phase difference and the phase difference command is limited to the lower limit value, the frequency increment command is a command to increase a frequency, according to a difference obtained by subtracting an actual phase difference command from the phase difference command limited to the lower limit value.

The frequency limiter 360 limits the frequency increment command so that the frequency of the switching does not exceed an upper limit frequency (denoted as "fmax"). For example, the frequency limiter 360 limits the frequency increment command to be equal to or smaller than an upper limit value corresponding to the upper limit frequency.

The frequency control unit 365 receives the limited frequency increment command from the frequency limiter 360, and controls the switching frequency of the primary circuit 130 and the secondary circuit 140, according to the frequency increment command. The frequency control unit 365 may also set the switching frequency of the primary circuit 130 and the secondary circuit 140 to a frequency designated by the frequency increment command. Alternatively, the frequency control unit 365 may change gradually the switching frequency so as to approximate to a frequency designated by the frequency increment command so that the frequency does not change sharply. The frequency control unit 365 in accordance with the present embodiment generates a basic switching waveform of the frequency designated by the frequency increment command, and outputs the same to the pause period adjustment unit 370.

The pause period adjustment unit 370 adjusts the ratio of the pause period in which an output from the primary circuit 130 or the secondary circuit 140 is paused, according to the output from the primary circuit 130 or the secondary circuit 140 and the target value. Here, the pause period adjustment unit 370 adjusts the ratio of the pause period, according to the output from the output-side circuit of the primary circuit 130 and the secondary circuit 140 and the target value. In the present embodiment, the pause period adjustment unit 370 changes the ratio of the pause period, on condition that the frequency of the switching is adjusted to the upper limit frequency by the frequency adjustment unit 350.

The pause period adjustment unit 370 includes a subtractor 375, and a pulse width control unit 380. The subtractor 375 outputs a pulse width decreasing command corresponding to a difference between the limited frequency increment command output by the frequency limiter 360 and the frequency increment command output by the subtractor 355. Thereby, the subtractor 375 outputs a value obtained by subtracting the adjustment amounts by the phase difference adjustment unit 330 and the frequency adjustment unit 350 from the control value output by the control calculation unit 320, and the pause period adjustment unit 370 can adjust the ratio of the pause period according to the value. In the present embodiment, the subtractor 375 subtracts a limited frequency increasing command output by the frequency adjustment unit 350 from a frequency increasing command output by the subtractor 355, thereby outputting, as the pulse width decreasing command, a command value excluding the adjustment amounts by the phase difference adjustment unit 330 and the frequency adjustment unit 350. When the frequency of the switching is the upper limit frequency and the frequency increment command is limited to the upper limit value, the pulse width decreasing command becomes a command to decrease a pulse width, according to a difference obtained by subtracting the frequency increment command limited to the upper limit value from an actual frequency increment command.

The pulse width control unit 380 receives the pulse width decreasing command, and decreases a pulse width of a pulse, which designates a period in which the voltage V1=E1 and −E1 and a period in which the voltage V2=E2 and −E2 in the switching of the primary circuit 130 and the secondary circuit 140, according to the pulse width decreasing command, during one cycle corresponding to the frequency set by the frequency adjustment unit 350. Thereby, the pulse width control unit 380 can increase a ratio of a period in which the electric power transmission between the primary circuit 130 and the secondary circuit 140 is paused, during one cycle. In the present embodiment, as the command value of the pulse width decreasing command becomes larger, the pulse width control unit 380 sets the smaller pulse width. The pulse width control unit 380 may change gradually the ratio of the pause period in the switching so as to approximate to the ratio of the pause period corresponding to the pulse width decreasing command so that the ratio of the pause period does not change sharply. The pulse width control unit 380 inputs the basic switching waveform generated by the frequency control unit 365, sets a pulse width of each pulse of the basic switching waveform to a pulse width corresponding to the pulse width decreasing command and outputs the same to the phase difference control unit 340.

According to the control device 150 as described above, it is possible to adjust the phase difference, the frequency, and the ratio of the pause period, based on the control value output by the same control calculation unit 320. In this way, when the plurality of adjustment operations is performed based on the control value that is output by the same control calculation unit 320, it is possible to suppress confusion of control, which may occur when different control calculation units are provided for each of the adjustment operations.

Figure 4:
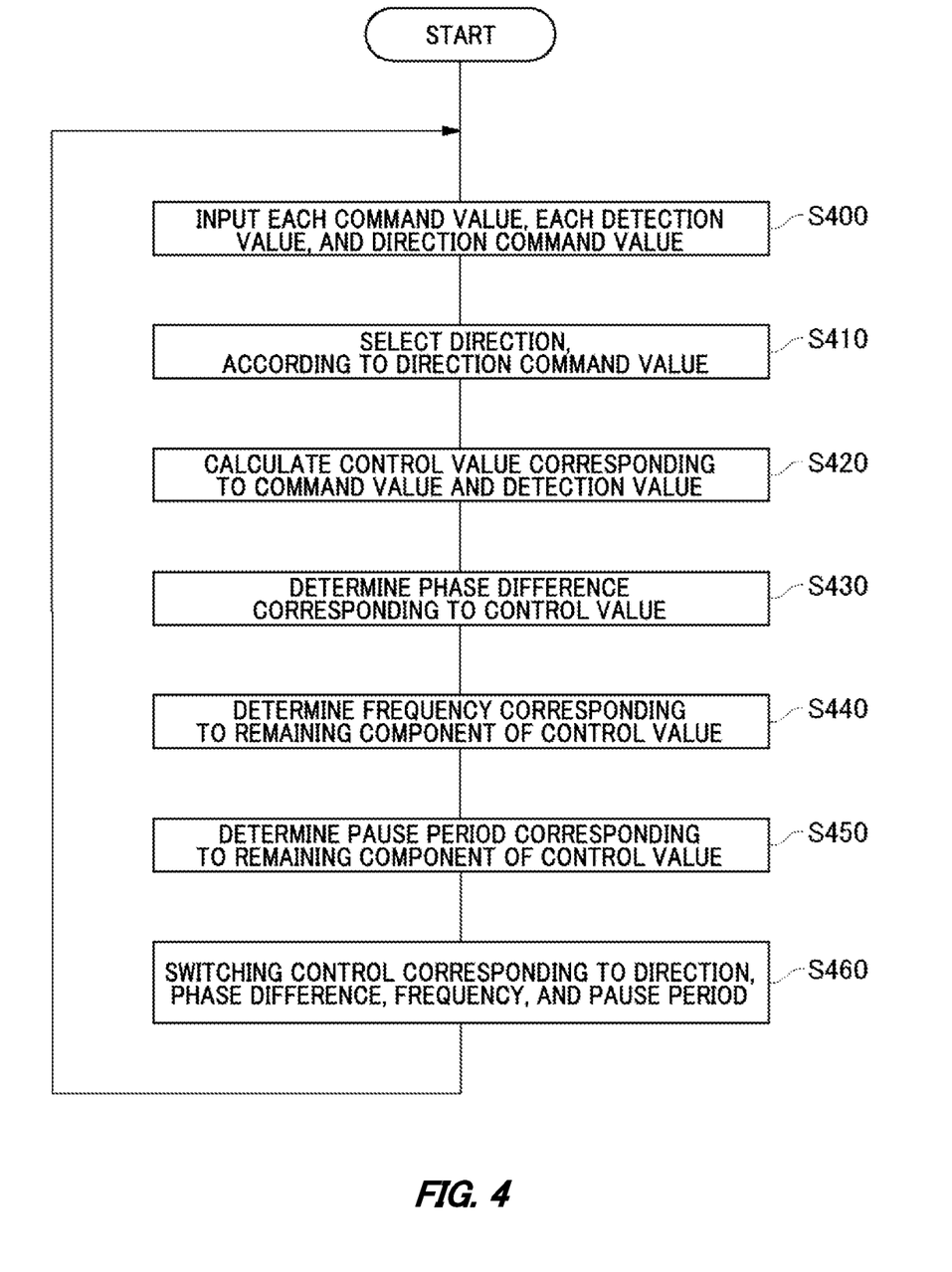
FIG. 4 shows an operation flow of the control device 150 in accordance with the present embodiment.

FIG. 4 shows an operation flow of the control device 150 in accordance with the present embodiment. In S400, the control device 150 inputs the E1 command value, the E2 command value, the E1 detection value, the E2 detection value, and the direction command value.

In S410, the selection unit 310 in the control device 150 selects a direction in which electric power is transmitted according to the direction command value, and selects and outputs a command value on the electric power output-side of the E1 command value and the E2 command value and a detection value on the electric power output-side of the E1 detection value and the E2 detection value.

In S420, the subtractor 315 and the control calculation unit 320 in the control device 150 calculate a control value corresponding to the command value and the detection value selected in S410. Here, the control calculation unit 320 may output the control value by PI control or PID control corresponding to the difference between the output and the target value. Alternatively, the control calculation unit 320 may also output the control value capable of reducing the difference between the output and the target value by using any means including averaging the difference between the output and the target value, and the like.

In S430, the phase difference adjustment unit 330 determines the switching phase difference of the primary circuit 130 and the secondary circuit 140, according to the control value from the control calculation unit 320. In S440, the frequency adjustment unit 350 determines the switching frequency of the primary circuit 130 and the secondary circuit 140, according to a remaining component, which excludes an amount to be used for the phase difference adjustment by the phase difference adjustment unit 330, of the control value from the control calculation unit 320. In S450, the pause period adjustment unit 370 determines a ratio or length of the pause period in which the electric power transmission between the primary circuit 130 and the secondary circuit 140 is paused, according to a remaining component, which excludes amounts to be used for the phase difference adjustment by the phase difference adjustment unit 330 and for the frequency adjustment by the frequency adjustment unit 350, of the control value from the control calculation unit 320.

In S460, the phase difference adjustment unit 330, the frequency adjustment unit 350, and the pause period adjustment unit 370 set a frequency, a pulse width and a phase of each of the control signals c1 to c8 with respect to the switching devices Q1 to Q8 so as to switch with the phase difference determined by the switching devices Q1 to Q4 in the primary circuit 130 and the switching devices Q5 to Q8 in the secondary circuit 140, according to the direction designated by the direction command value, the phase difference determined in S430, the frequency determined in S440, and the length of the pause period determined in S450.

Figure 5:
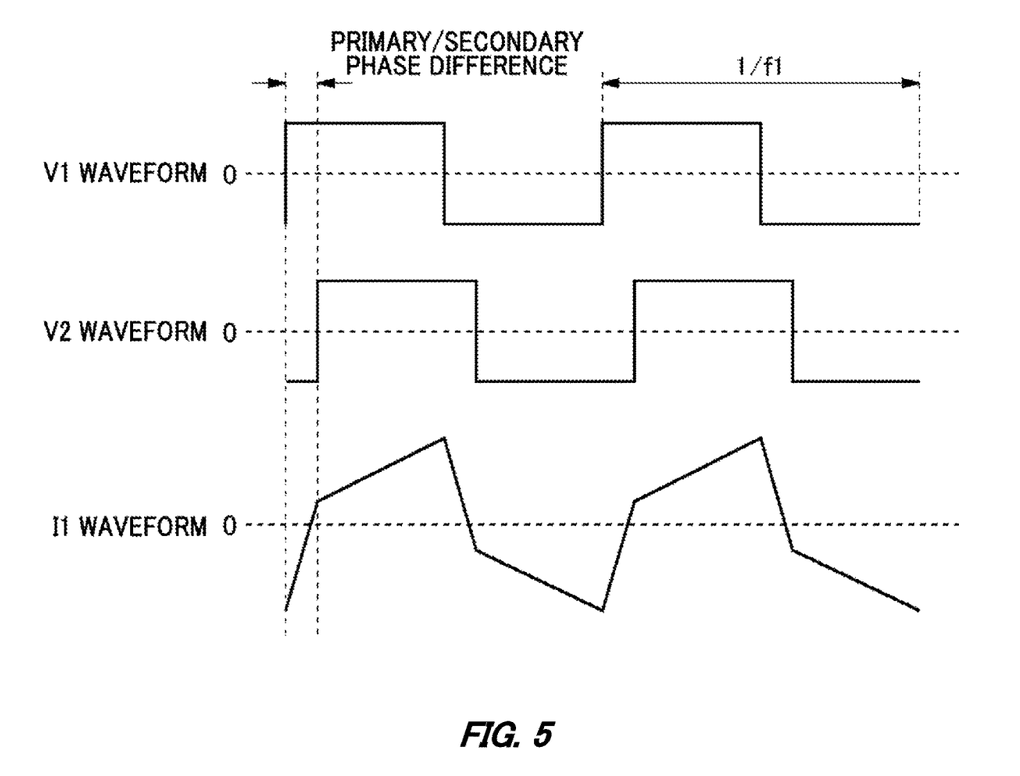
FIG. 5 is an example of an operating waveform of the power conversion device 100 in accordance with the present embodiment, during a phase difference adjustment operation.

FIG. 5 is an example of an operating waveform of the power conversion device 100 in accordance with the present embodiment, during a phase difference adjustment operation. FIG. 5 shows an operating waveform during transmission of electric power from the primary-side to the secondary-side when the voltage E1 of the primary-side device 110 is higher than the voltage E2 of the secondary-side device 120, in a case where the winding ratio of the transformer Tr is 1:1. Since the operating waveform shown in FIG. 5 is similar to the V1 waveform, the V2 waveform, and the I1 waveform (E1>E2) shown in FIG. 2, the descriptions thereof are omitted, except following differences.

In the phase difference adjustment operation, the control device 150 switches the primary circuit 130 and the secondary circuit 140 with a basic frequency f1, thereby switching the electric power output-side with a phase difference with respect to the electric power input-side. The control calculation unit 320 adjusts the phase difference of the switching between the primary circuit 130 and the secondary circuit 140, according to the difference between the command value and the detection value. Here, as described above with respect to FIG. 2, as the phase difference command is larger, the phase difference adjustment unit 330 increases the phase difference. When the phase difference increases, a rise period of the current I1 between the voltage V1=the voltage E1 and the voltage V2=the voltage −E2 becomes longer, and electric power that is supplied to the secondary-side device 120 after the voltage V1=the voltage E1 and the voltage V2=the voltage E2 increases. Also, when the phase difference increases, a fall period of the current I1 between the voltage V1=the voltage −E1 and the voltage V2=the voltage E2 becomes longer, and electric power that is supplied to the secondary-side device 120 between the voltage V1=the voltage −E1 and the voltage V2=the voltage −E2 increases. By increasing the phase difference in this way, the control device 150 can increase a transmission amount of electric power to the output-side circuit of the primary circuit 130 and the secondary circuit 140. In contrast, as the phase difference command is smaller, the phase difference adjustment unit 330 reduces the phase difference to shorten the rise period of the current I1 between the voltage V1=the voltage E1 and the voltage V2=the voltage −E2 and to shorten the fall period of the current I1 between the voltage V1=the voltage −E1 and the voltage V2=the voltage E2. By reducing the phase difference in this way, the control device 150 can reduce the transmission amount of electric power to the output-side circuit of the primary circuit 130 and the secondary circuit 140.

Here, in a use (for example, a case where a battery on the electric power output-side is charged) where the voltage (for example, the voltage E1) on the electric power input-side of the primary-side device 110 and the secondary-side device 120 is considerably higher than the voltage (for example, the voltage E2) on the electric power output-side, even when the phase difference is set to 0, the magnitude of the current I1 (the current I2) continues to increase, so that the transmission amount of electric power may increase, as shown in FIG. 5. The power conversion device 100 in accordance with the present embodiment suppresses a magnitude of a peak of the current I1 and the transmission amount of electric power by performing a frequency adjustment operation, as described below.

Figure 6:
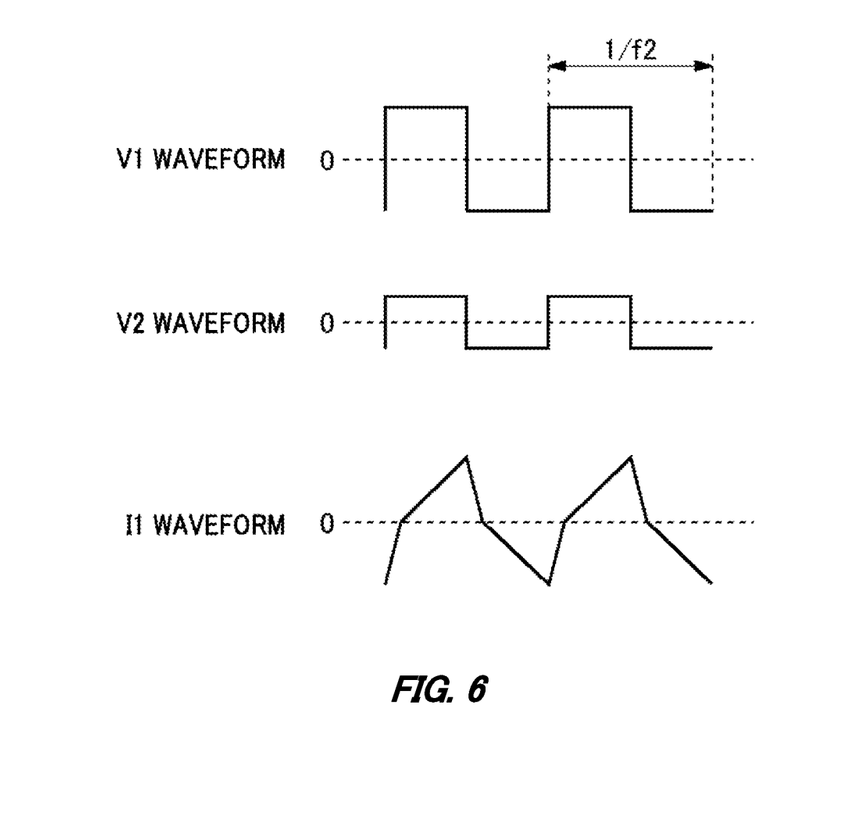
FIG. 6 is an example of an operating waveform of the power conversion device 100 in accordance with the present embodiment, during a frequency adjustment operation.

FIG. 6 is an example of an operating waveform of the power conversion device 100 in accordance with the present embodiment, during a frequency adjustment operation. FIG. 6 shows a waveform of the voltage V1, a waveform of the voltage V2, and a waveform of the current I1 during the frequency adjustment operation, from above. In each waveform, a horizontal axis indicates time.

In FIG. 6, the voltage V1 waveform and the voltage V2 waveform indicate a case where the voltage (for example, the voltage E1) on the electric power input-side of the primary-side device 110 and the secondary-side device 120 is higher than the voltage (for example, the voltage E2) on the electric power output-side. In this case, as shown in the current I1 waveform, the magnitude of the current I1 increases even during a period in which the secondary-side device 120 is charged at the voltage V1=the voltage E1 and the voltage V2=the voltage E2 and even during a period in which the secondary-side device 120 is charged at the voltage V1=the voltage −E1 and the voltage V2=the voltage −E2.

The power conversion device 100 performs the frequency adjustment operation, in response to a situation where electric power, which is to be transmitted from the primary-side to the secondary-side, is reduced and the phase difference is thus adjusted to the lower limit phase difference during the phase difference adjustment operation. In the frequency adjustment operation, the control device 150 adjusts a switching frequency f2 of the primary circuit 130 and the secondary circuit 140, in response to the output and the target value from the circuit on the electric power output-side of the primary circuit 130 and the secondary circuit 140, i.e., from the secondary circuit 140 when transmitting electric power from the primary-side to the secondary-side.

As described above with respect to FIG. 2, the frequency adjustment unit 350 sets, as the frequency increment command, a minus value of the value obtained by subtracting the adjustment amount by the phase difference adjustment unit 330 from the control value output by the control calculation unit 320, and increases the frequency f2 as the phase difference command output by the control calculation unit 320 is smaller, based on the frequency increment command, thereby reducing the transmission amount of electric power.

The frequency adjustment unit 350 in accordance with the present embodiment changes the frequency f2 between the frequency f1 and the upper limit frequency fmax when the phase difference adjustment operation is performed, based on the frequency increment command. When the frequency increases, a switching cycle 1/f2 is shortened. By increasing the frequency in this way, the control device 150 shortens a period in which the magnitude of the current I1 increases, thereby suppressing the magnitude of the peak of the current I1 and lowering electric power to be transmitted.

In the frequency adjustment operation, the power conversion device 100 can reduce the transmission amount of electric power by increasing the frequency, without providing a pause period within each switching cycle. Here, when a pause period is provided, since electric power is not transmitted during the pause period, a peak value of a magnitude of current caused to flow during a period in which electric power is transmitted becomes larger than a peak value of a magnitude of current that is caused to flow when transmitting the same amount of electric power by raising the frequency through the frequency adjustment operation. Therefore, when the frequency adjustment operation is used, it is possible to increase an amount of electric power that is transmitted at a peak value of the same current, as compared to a case where the pause period is provided. The power conversion device 100 may perform the frequency adjustment operation, in a situation, a using condition and the like where current caused to flow during a period other than a pause period increases and a periodic current variation becomes large when the pause period is provided.

Figure 7:
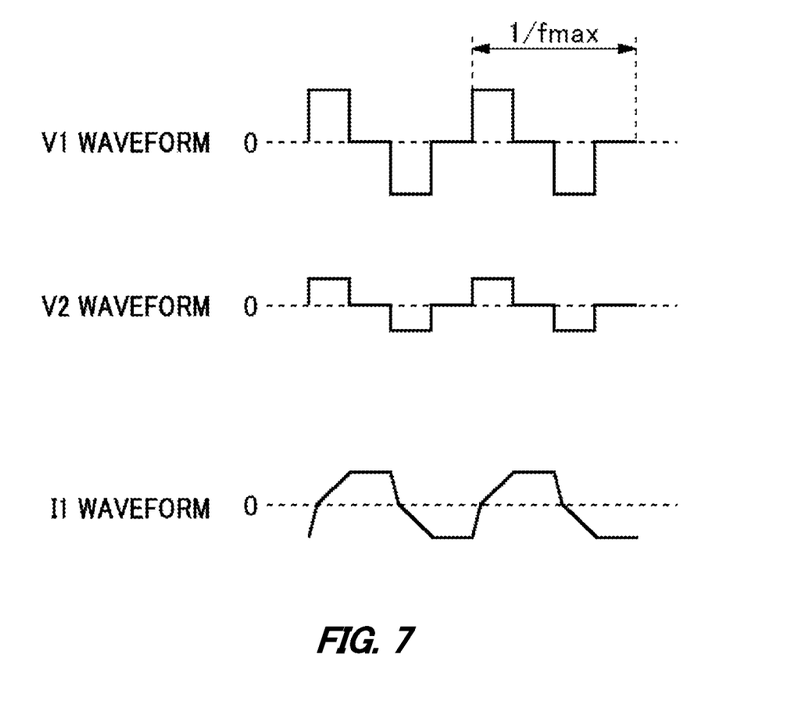
FIG. 7 is an example of an operating waveform of the power conversion device 100 in accordance with the present embodiment, during a pause period adjustment operation.

FIG. 7 is an example of an operating waveform of the power conversion device 100 in accordance with the present embodiment, during a pause period adjustment operation. FIG. 7 shows a waveform of the voltage V1, a waveform of the voltage V2, and a waveform of the current I1 during the pause period adjustment operation, from above. In each waveform, a horizontal axis indicates time.

In FIG. 7, the voltage V1 waveform and the voltage V2 waveform indicate a case where the voltage (for example, the voltage E1) on the electric power input-side of the primary-side device 110 and the secondary-side device 120 is higher than the voltage (for example, the voltage E2) on the electric power output-side. In this case, as shown in the current I1 waveform, the magnitude of the current I1 increases even during a period in which the secondary-side device 120 is charged at the voltage V1=the voltage E1 and the voltage V2=the voltage E2 and even during a period in which the secondary-side device 120 is charged at the voltage V1=the voltage −E1 and the voltage V2=the voltage −E2.

The power conversion device 100 performs the pause period adjustment operation, in response to a situation where electric power, which is to be transmitted from the primary-side to the secondary-side, is reduced and the frequency is thus adjusted to the frequency fmax during the frequency adjustment operation. In the pause period adjustment operation, the control device 150 adjusts the ratio of the pause period in the switching of the primary circuit 130 and the secondary circuit 140, in response to the output and the target value from the circuit on the electric power output-side of the primary circuit 130 and the secondary circuit 140, i.e., from the secondary circuit 140 when transmitting electric power from the primary-side to the secondary-side.

As described above with respect to FIG. 2, the pause period adjustment unit 370 sets, as the pulse width decreasing command, a value obtained by subtracting the adjustment amounts by the phase difference adjustment unit 330 and the frequency adjustment unit 350 from the control value output by the control calculation unit 320, and decreases the pulse width of the switching as the phase difference command output by the control calculation unit 320 is smaller, based on the pulse width decreasing command, thereby reducing the transmission amount of electric power. Here, the control device 150 controls the switching devices Q1 to Q8 so that the voltage V1=0 and the voltage V2=0, during the pause period. The control device 150 may set the voltage V1=0 by turning on the switching devices Q1 and Q3 and turning off the switching devices Q2 and Q4, for example, thereby connecting the intermediate points a1 and b1 to the positive-side DC bus bar P1. Alternatively, the control device 150 may set the voltage V1=0 by turning off the switching devices Q1 and Q3 and turning on the switching devices Q2 and Q4, for example, thereby connecting the intermediate points a1 and b1 to the negative-side DC bus bar N1. Also, the control device 150 may set the voltage V2=0 by controlling the switching devices Q5 to Q8, similar to the switching devices Q1 to Q4.

During the pause period where the voltage V1=0 and the voltage V2=0, the primary circuit 130 circulates current via the inductor L1 and the transformer Tr without passing through the primary-side device 110, and the secondary circuit 140 circulates current via the inductor L2 and the transformer Tr without passing through the secondary-side device 120. Therefore, the power conversion device 100 maintains the current I1 and the current I2 during the pause period. Note that, the currents I1 and I2 may be actually reduced due to an influence of a wire resistance on a circulation path of current, for example. The power conversion device 100 collects the currents I1 and I2 to the capacitors C1 and C2 or uses the same for charging the primary-side device 110 and the secondary-side device 120 after the pause period ends.

The power conversion device 100 of the present embodiment performs control (so-called PWM control) of providing the pause period in which electric power is not transmitted by reducing a time width in which electric power is transmitted in each cycle of the switching. In the pause period adjustment operation, the power conversion device 100 can reduce the transmission amount of electric power by increasing the ratio of the pause period during one switching cycle, even without lowering the frequency of the switching. Here, the power conversion device 100 can set most of one switching cycle, as the pause period. Therefore, the pause period adjustment operation can support a small transmission amount of electric power, as compared to the frequency adjustment operation, depending on implementation. In the pause period adjustment operation, the peak current during the electric power transmission increases, as compared to the frequency adjustment operation. Therefore, the electric power transmission efficiency may be higher in the frequency adjustment operation, depending on implementation of the power conversion device 100. Therefore, in such implementation, the power conversion device 100 performs the frequency adjustment operation, and further performs the pause period adjustment operation when the transmission amount of electric power is reduced, so that it is possible to effectively transmit electric power.

Alternatively, the power conversion device 100 may perform control (so-called burst control) of providing the pause period in which electric power is not transmitted for a predetermined period (for example, a period exceeding one cycle) by stopping the periodic switching operation. Also, the power conversion device 100 may switch the PWM control and the burst control on the pause period, depending on a targeted ratio of the pause period.

In the above embodiment, the control device 150 switches the phase difference adjustment operation, the frequency adjustment operation, and the pause period adjustment operation. Alternatively, the control device 150 may also adjust the transmission amount of electric power by the frequency adjustment operation without performing the phase difference adjustment operation and the pause period adjustment operation, may also adjust the transmission amount of electric power by a combination of the phase difference adjustment operation and the frequency adjustment operation, and may also adjust the transmission amount of electric power by a combination of the frequency adjustment operation and the pause period adjustment operation.

Also, the control device 150 may raise the frequency while decreasing the phase difference, instead of the control of performing the frequency adjustment operation after the phase difference of the switching reaches the lower limit phase difference in the phase difference adjustment operation, as the required transmission amount of electric power decreases. Similarly, the control device 150 may increase the ratio of the pause period while raising the frequency, as the required transmission amount of electric power decreases. Also, the control device 150 may change all of the phase difference, the frequency, and the ratio of the pause period in parallel, depending on the required transmission amount of electric power.

Also, when the frequency reaches the upper limit frequency in the frequency adjustment operation and the control device 150 shifts to the pause period adjustment operation, the control device 150 may lower the frequency while increasing the ratio of the pause period, as the required transmission amount of electric power decreases, thereby reducing a loss due to the switching. In this case, the control device 150 may lower the frequency of the switching within a range up to the frequency that is used for the phase difference adjustment operation, for example, within a range of a preset lower limit frequency or higher outside an audible range (for example, 20 kHz or higher).

In the above embodiment, the power conversion device 100 has the configuration capable of transmitting bidirectionally electric power. Alternatively, the power conversion device 100 may also be controlled by the control device 150 so that electric power is transmitted only in one direction such as a direction from the primary-side to the secondary-side.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a large-scale machine (super computer), special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A power conversion device comprising:
   a transformer;
   a first bridge circuit connected to a primary-side of the transformer and capable of switching a polarity of a connection between a first pair of DC bus bars on the primary-side and the transformer;
   a second bridge circuit connected to a secondary-side of the transformer and capable of switching a polarity of a connection between a second pair of DC bus bars on the secondary-side and the transformer; and a control device capable of performing control of switching the first bridge circuit and the second bridge circuit with a phase difference, wherein the control device has a frequency adjustment unit for adjusting a frequency of switching of the first bridge circuit and the second bridge circuit, according to an output from the first bridge circuit or the second bridge circuit and a target value, the control device further has a phase difference adjustment unit for adjusting the phase difference of the switching, according to the output from the first bridge circuit or the second bridge circuit and the target value, the control device further has a pause period adjustment unit for adjusting a ratio of a pause period in which the output from the first bridge circuit or the second bridge circuit is paused, according to the output from the first bridge circuit or the second bridge circuit and the target value, the control device further has a control calculation unit for outputting a control value corresponding to a difference between the output from the first bridge circuit or the second bridge circuit and the target value, the phase difference adjustment unit is configured to adjust the phase difference of the switching, according to the control value, the frequency adjustment unit is configured to adjust the frequency of the switching, according to a value obtained by subtracting an adjustment amount provided by the phase difference adjustment unit from the control value, and the pause period adjustment unit is configured to adjust the ratio of the pause period, according to a value obtained by subtracting adjustment amounts provided by the phase difference adjustment unit and the frequency adjustment unit from the control value.

2. The power conversion device according to claim 1, wherein
the frequency adjustment unit is configured to change the frequency of the switching based on a condition that the phase difference of the switching is adjusted to a lower limit phase difference.

3. The power conversion device according to claim 1, wherein
the pause period adjustment unit is configured to change the ratio of the pause period based on a condition that the frequency of the switching is adjusted to an upper limit frequency.

4. The power conversion device according to claim 1, wherein
the control calculation unit is configured to output the control value by PI control or PID control corresponding to the difference between the output from the first bridge circuit or the second bridge circuit and the target value.

5. The power conversion device according to claim 1, wherein
the control device further has a selection unit for selecting which of the first bridge circuit and the second bridge circuit is set to an output-side of electric power based on an instruction from an input.

6. A control method of a power conversion device, the power conversion device comprising:
a transformer;
a first bridge circuit connected to a primary-side of the transformer and capable of switching a polarity of a connection between a first pair of DC bus bars on the primary-side and the transformer;

second bridge circuit connected to a secondary-side of the transformer and capable of switching a polarity of a connection between a second pair of DC bus bars on the secondary-side and the transformer; and a control device capable of performing control of switching the first bridge circuit and the second bridge circuit with a phase difference, the control method comprising:

adjusting a frequency of switching of the first bridge circuit and the second bridge circuit, according to an output from the first bridge circuit or the second bridge circuit and a target value, wherein the control device further adjusts the phase difference of the switching using a phase difference adjustment unit according to the output from the first bridge circuit or the second bridge circuit and the target value, the control device further adjusts a ratio of a pause period in which the output from the first bridge circuit or the second bridge circuit is paused using a pause period adjustment unit according to the output from the first bridge circuit or the second bridge circuit and the target value, the control device further outputs a control value using a control calculation unit corresponding to a difference between the output from the first bridge circuit or the second bridge circuit and the target value, the phase difference of the switching is adjusted according to the control value, the frequency of the switching is adjusted using a frequency adjustment unit according to a value obtained by subtracting an adjustment amount provided by the phase difference adjustment unit from the control value, and the ratio of the pause period is adjusted according to a value obtained by subtracting adjustment amounts provided by the phase difference adjustment unit and the frequency adjustment unit from the control value.

7. The control method according to claim 6, wherein adjusting the frequency includes changing the frequency of the switching based on a condition that the phase difference of the switching is adjusted to a lower limit phase difference.

8. A non-transitory computer-readable medium having recorded thereon a control program for controlling a power conversion device,
the power conversion device comprising:
a transformer;
a first bridge circuit connected to a primary-side of the transformer and capable of switching a polarity of a connection between a first pair of DC bus bars on the primary-side and the transformer;
a second bridge circuit connected to a secondary-side of the transformer and capable of switching a polarity of a connection between a second pair of DC bus bars on the secondary-side and the transformer; and
a control device capable of performing control of switching the first bridge circuit and the second bridge circuit with a phase difference, wherein
the control program is for causing the control device to function as a frequency adjustment unit for adjusting a frequency of switching of the first bridge circuit and the second bridge circuit, according to an output from the first bridge circuit or the second bridge circuit and a target value,
the control device further has a phase difference adjustment unit for adjusting the phase difference of the switching, according to the output from the first bridge circuit or the second bridge circuit and the target value, the control device further has a pause period adjustment unit for adjusting a ratio of a pause period in which the output from the first bridge circuit or the second bridge circuit is paused, according to the output from the first bridge circuit or the second bridge circuit and the target value, the control device further has a control calculation unit for outputting a control value corresponding to a difference between the output from the first bridge circuit or the second bridge circuit and the target value, the phase difference adjustment unit is configured to adjust the phase difference of the switching, according to the control value, the frequency adjustment unit is configured to adjust the frequency of the switching, according to a value obtained by subtracting an adjustment amount provided by the phase difference adjustment unit from the control value, and the pause period adjustment unit is configured to adjust the ratio of the pause period, according to a value obtained by subtracting adjustment amounts provided by the phase difference adjustment unit and the frequency adjustment unit from the control value.

9. The non-transitory computer-readable medium according to claim 8, wherein the frequency adjustment unit is configured to change the frequency of the switching based on a condition that the phase difference of the switching is adjusted to a lower limit phase difference.

* * * * *